US010186724B2

(12) United States Patent
Gasda et al.

(10) Patent No.: US 10,186,724 B2
(45) Date of Patent: Jan. 22, 2019

(54) CARBON DIOXIDE SEPARATOR, FUEL CELL SYSTEM INCLUDING SAME, AND METHOD OF OPERATING THE FUEL CELL SYSTEM

(71) Applicants: BLOOM ENERGY CORPORATION, Sunnyvale, CA (US); OHIO STATE INNOVATION FOUNDATION, Columbus, OH (US)

(72) Inventors: Michael Gasda, Mountain View, CA (US); Arne Ballantine, Palo Alto, CA (US); Chockkalingam Karuppaiah, Cupertino, CA (US); W. S. Winston Ho, Columbus, OH (US)

(73) Assignees: BLOOM ENERGY CORPORATION, Sunnyvale, CA (US); OHIO STATE INNOVATION FOUNDATION, Columbus, OH (US)

( * ) Notice: Subject to any disclaimer, the term of this patent is extended or adjusted under 35 U.S.C. 154(b) by 219 days.

(21) Appl. No.: 15/014,584

(22) Filed: Feb. 3, 2016

(65) Prior Publication Data

US 2016/0248111 A1 Aug. 25, 2016

Related U.S. Application Data

(60) Provisional application No. 62/111,875, filed on Feb. 4, 2015.

(51) Int. Cl.
*H01M 8/06* (2016.01)
*H01M 8/04* (2016.01)
(Continued)

(52) U.S. Cl.
CPC ..... *H01M 8/0668* (2013.01); *H01M 8/04097* (2013.01); *H01M 8/04126* (2013.01);
(Continued)

(58) Field of Classification Search
CPC ............ H01M 8/0668; H01M 8/0687; H01M 8/04738; H01M 8/04843; H01M 8/04791;
(Continued)

(56) References Cited

U.S. PATENT DOCUMENTS 5,611,843 A * 3/1997 Ho ...................... B01D 53/228 525/61
6,924,053 B2 8/2005 McElroy
(Continued)

FOREIGN PATENT DOCUMENTS

WO WO2010125443 A1 11/2010

OTHER PUBLICATIONS

European Patent Office Communication Pursuant to Rules 161(2) and 162 EPC for European Patent Application No. 16747183.8, dated Sep. 12, 2017, 2 pages.
(Continued)

*Primary Examiner* — Lisa S Park
(74) *Attorney, Agent, or Firm* — The Marbury Law Group PLLC

(57) ABSTRACT

A system and method in which a high temperature fuel cell stack exhaust stream is recycled back into the fuel inlet stream of the high temperature fuel cell stack. The recycled stream may be sent to a carbon dioxide separator that separates carbon dioxide from the fuel exhaust stream. The carbon dioxide separator may include a carbon dioxide separation membrane, an oxygen blocking membrane, and a water blocking membrane.

11 Claims, 12 Drawing Sheets

(51) Int. Cl.

| | |
|---|---|
| ***H01M 8/0668*** | (2016.01) |
| ***H01M 8/04492*** | (2016.01) |
| ***H01M 8/04828*** | (2016.01) |
| ***H01M 8/04089*** | (2016.01) |
| ***H01M 8/04746*** | (2016.01) |
| ***H01M 8/04302*** | (2016.01) |
| ***H01M 8/04303*** | (2016.01) |
| ***H01M 8/04791*** | (2016.01) |
| ***H01M 8/04119*** | (2016.01) |
| ***H01M 8/0662*** | (2016.01) |
| ***H01M 8/04701*** | (2016.01) |
| *B01D 71/64* | (2006.01) |
| *H01M 8/124* | (2016.01) |

(52) U.S. Cl.

CPC ... *H01M 8/04302* (2016.02); *H01M 8/04303* (2016.02); *H01M 8/04492* (2013.01); *H01M 8/04738* (2013.01); *H01M 8/04761* (2013.01); *H01M 8/04776* (2013.01); *H01M 8/04791* (2013.01); *H01M 8/04828* (2013.01); *H01M 8/04843* (2013.01); *H01M 8/0687* (2013.01); *B01D 71/64* (2013.01); *B01D 2257/104* (2013.01); *B01D 2257/504* (2013.01); *H01M 2008/1293* (2013.01); *Y02C 10/04* (2013.01)

(58) Field of Classification Search

CPC ......... H01M 8/04492; H01M 8/04828; H01M 8/04761; H01M 8/04776; H01M 8/04097; H01M 8/04302; H01M 8/04126; H01M 8/04303; H01M 2008/1293; Y02C 10/04

See application file for complete search history.

(56) References Cited

U.S. PATENT DOCUMENTS

| | | | | |
|---|---|---|---|---|
| 6,958,085 | B1 * | 10/2005 | Parrish | B01D 53/228 423/226 |
| 7,045,238 | B2 | 5/2006 | Gottmann et al. | |
| 7,591,880 | B2 | 9/2009 | Levan et al. | |
| 7,833,668 | B2 | 11/2010 | Ballantine et al. | |
| 7,883,803 | B2 | 2/2011 | McElroy et al. | |
| 8,101,307 | B2 | 1/2012 | McElroy et al. | |
| 9,190,685 | B2 | 11/2015 | McElroy et al. | |
| 9,287,571 | B2 | 3/2016 | McElroy et al. | |
| 2002/0110503 | A1 | 8/2002 | Gittleman et al. | |
| 2006/0172160 | A1 | 8/2006 | Min et al. | |
| 2007/0178338 | A1 | 8/2007 | McElroy et al. | |
| 2008/0127632 | A1 * | 6/2008 | Finkenrath | B01D 53/22 60/274 |
| 2008/0156188 | A1 * | 7/2008 | Hagg | B01D 53/228 95/51 |
| 2008/0166602 | A1 | 7/2008 | Bronold et al. | |
| 2008/0241612 | A1 | 10/2008 | Ballantine et al. | |
| 2008/0241638 | A1 | 10/2008 | McElroy et al. | |
| 2009/0208785 | A1 | 8/2009 | McElroy et al. | |
| 2010/0239924 | A1 | 9/2010 | McElroy et al. | |
| 2010/0266923 | A1 | 10/2010 | McElroy et al. | |
| 2011/0167821 | A1 | 7/2011 | Baker et al. | |
| 2012/0067812 | A1 | 3/2012 | Muratani et al. | |
| 2013/0108936 | A1 * | 5/2013 | McElroy | H01M 8/0668 429/410 |
| 2013/0160650 | A1 | 6/2013 | Okada et al. | |
| 2013/0284022 | A1 | 10/2013 | Hiraki et al. | |
| 2014/0141139 | A1 * | 5/2014 | Gottschlich | A23B 7/148 426/418 |

OTHER PUBLICATIONS

Notification of Transmittal of the International Search Report and the Written Opinion of the International Searching Authority for PCT/US2016/016353, dated May 23, 2016, 14 pages.

International Preliminary Report on Patentability from the International Searching Authority for PCT/US2016/016353, dated Aug. 17, 2017, 11 pages.

European Office Communication and Supplementary European Search Report for European Patent Application No. EP 16747183, dated Aug. 17, 2018, 7 pages.

* cited by examiner

CARBON DIOXIDE SEPARATOR, FUEL CELL SYSTEM INCLUDING SAME, AND METHOD OF OPERATING THE FUEL CELL SYSTEM

BACKGROUND

Aspects of the present invention relate generally to carbon dioxide separators, fuel cell systems including the same, and methods of operating fuel cell systems.

Fuel cells are electrochemical devices which can convert energy stored in fuels to electrical energy efficiencies. High temperature fuel cells include solid oxide fuel cells (SOFC) and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

Removing $CO_2$ from the anode exhaust stream of SOFC systems using a carbon dioxide separator can improve efficiency. The removal of water from the system should also be precisely controlled to produce an appropriate "water balance". In addition, many carbon dioxide separators include membranes that are sensitive to oxygen and water loss.

SUMMARY

According to various embodiments, a carbon dioxide separator for a fuel cell system comprises: a sweep channel configured to receive a sweep gas; a feed channel configured to receive a fuel exhaust stream of the fuel cell system; a carbon dioxide separation membrane disposed between the sweep channel and the feed channel, the carbon dioxide separation membrane having a higher permeability to carbon dioxide and water than to hydrogen gas, carbon monoxide, and nitrogen gas; and a first blocking layer disposed on a first side of the carbon dioxide separation membrane. The first blocking layer comprises at least one of: a first oxygen blocking layer disposed between the carbon dioxide separation membrane and the sweep channel, the oxygen blocking layer having a higher permeability to water and carbon dioxide than to oxygen gas and nitrogen gas; and a first hydrophobic water blocking layer.

According to various embodiments, a fuel cell system comprises: a fuel cell stack; the carbon dioxide separator described above, the carbon dioxide separator being configured to remove carbon dioxide from the fuel exhaust stream and to create a purified recycled fuel exhaust stream; a first recycling conduit fluidly connecting a fuel exhaust outlet of the fuel cell stack to the feed channel and configured to provide the recycled fuel exhaust stream to the carbon dioxide separator, by diverting at least a portion of a fuel exhaust stream output by the fuel cell stack; and a second recycling conduit fluidly connecting a feed channel outlet of the carbon dioxide separator to a fuel inlet conduit connected to the fuel cell stack, the second recycling conduit adapted to provide the purified recycled fuel exhaust stream to the fuel inlet conduit.

According to various embodiments, a method of operating a fuel cell system comprises: providing a fuel inlet stream to a fuel cell stack; operating the fuel cell stack to generate a fuel exhaust stream; providing at least a portion of the fuel exhaust stream to a feed channel of a carbon dioxide separator, the carbon dioxide separator configured to separate carbon dioxide from the portion of the fuel exhaust stream and to thereby generate a purified fuel exhaust stream; providing a sweep gas to a sweep channel of the carbon dioxide separator, to sweep the separated carbon dioxide from the carbon dioxide separator; and recycling the purified fuel exhaust stream to the fuel inlet stream. The carbon dioxide separator comprises: a carbon dioxide separation membrane disposed between the sweep channel and the feed channel, the carbon dioxide separation membrane having a higher permeability to carbon dioxide and water than to hydrogen gas, carbon monoxide, and nitrogen gas; and a blocking layer disposed on a first side of the carbon dioxide separation membrane. The blocking layer comprises at least one of: a first oxygen blocking layer having a higher permeability to water and carbon dioxide than to oxygen gas and nitrogen gas; and a first hydrophobic water blocking layer.

DETAILED DESCRIPTION OF THE EXEMPLARY EMBODIMENTS

Exemplary embodiments of the invention provide a system and method in which a high temperature fuel cell stack exhaust stream is recycled back into the fuel inlet stream of the high temperature fuel cell stack. The recycled stream may be sent to a carbon dioxide separator that separates carbon dioxide from the fuel exhaust stream. The removal of carbon dioxide from the recycled anode exhaust increases the efficiency of the high temperature fuel cell stack. The carbon dioxide separator may include a carbon dioxide separation membrane. In one aspect of the invention, the carbon dioxide separator includes an oxygen blocking layer to prevent oxidation of the carbon dioxide separation membrane, and/or a water blocking layer to control water permeation through, and/or condensation on, the carbon dioxide separation membrane.

Exemplary embodiments of the invention illustrate how carbon dioxide separation devices may be used together with a fuel cell system, such as a solid oxide fuel cell system. Additional embodiments illustrate how water separation devices may be used together with a fuel cell system, such as a solid oxide fuel cell system. Additional embodiments illustrate how carbon dioxide separation devices and water separation devices may be used together with a fuel cell system, such as a solid oxide fuel cell system. It should be noted that other fuel cell systems, such as molten carbonate systems, may also be used.

Figure 1:
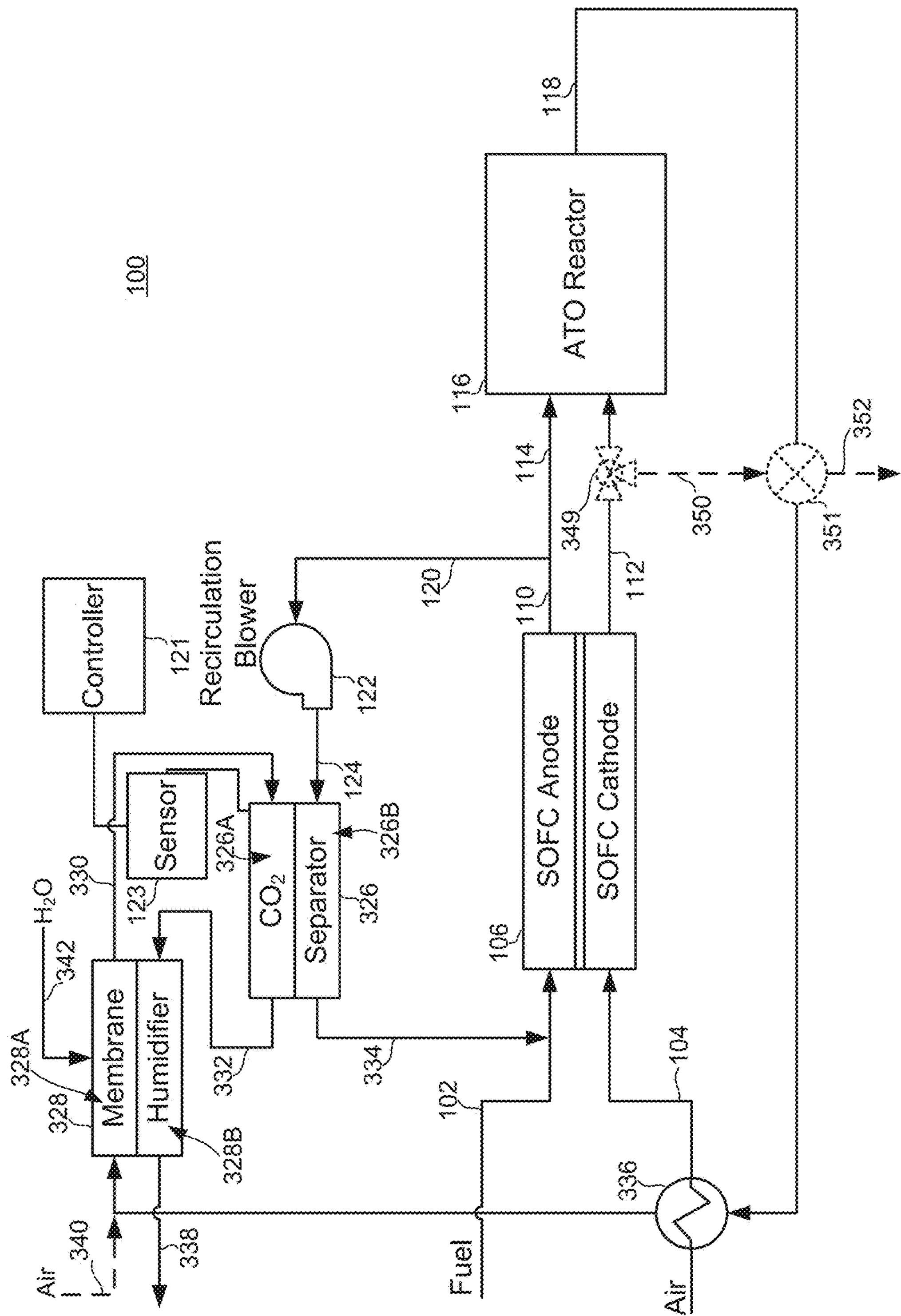
FIGS. 1-6 are schematics of fuel cell systems according to various embodiments of the present invention.

FIG. 1 illustrates a fuel cell system 100 according to one embodiment of the present invention. Preferably, the system 100 is a high temperature fuel cell stack system, such as a solid oxide fuel cell (SOFC) system. The system 100 may be a regenerative system such as a solid oxide regenerative fuel cell (SORFC) system which operates in both fuel cell (i.e., discharge or power generation) and electrolysis (i.e., charge) modes or it may be a non-regenerative system which only operates in the fuel cell mode.

The system 100 contains a high temperature fuel cell stack 106. The stack may contain a plurality of SOFCs or SORFCs. The high temperature fuel cell stack 106 is illustrated schematically to show one solid oxide fuel cell of the stack containing a ceramic electrolyte, such as yttria or scandia stabilized zirconia, an anode electrode, such as a nickel-stabilized zirconia cermet, and a cathode electrode, such as lanthanum strontium manganite. Each fuel cell contains an electrolyte, an anode electrode on one side of the electrolyte, a cathode electrode on the other side of the electrolyte. The stack also contains other components, such as interconnects (e.g., separator plates/electrical contacts), seals, etc. In an SOFC operating in the fuel cell mode, the oxidizer, such as air or oxygen gas, enters the cathode chamber (e.g., a space between a cathode electrode and ribs of an adjacent interconnect), while the fuel, such as hydrogen or hydrocarbon fuel, enters the anode chamber (e.g., a space between an anode electrode and ribs of an adjacent interconnect). Any suitable fuel cell designs and component materials may be used. The system 100 further contains an anode tail gas oxidizer (ATO) reactor 116, a recirculation blower 122, a carbon dioxide separator 326, and an optional membrane humidifier 328.

The system 100 operates as follows. The fuel inlet stream is provided into the fuel cell stack 106 through fuel inlet conduit 102. The fuel may comprise any suitable fuel, such as a hydrogen fuel or a hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, hydrogen gas or other mixtures. For example, the mixture may comprise syngas derived from coal or natural gas reformation. The fuel inlet conduit 102 provides the fuel inlet stream to the anode side of the fuel cell stack 106.

Air or another oxygen containing gas is provided into the stack 106 through an air inlet conduit 104. The air inlet conduit 104 provides air to the cathode side of the fuel cell stack 106.

Once the fuel and oxidant are provided into the fuel cell stack 106, the stack 106 is operated to generate electricity and a fuel exhaust stream. The fuel exhaust stream may contain hydrogen, water vapor, carbon monoxide, carbon dioxide, some un-reacted hydrocarbon gas, such as methane, and other reaction by-products and impurities.

The fuel exhaust stream (i.e., the stack anode exhaust stream) is provided from the stack 106 via fuel exhaust conduit 110. The air exhaust stream (i.e., the stack cathode exhaust stream) is provided from the stack air exhaust outlet via air exhaust conduit 112. The fuel exhaust conduit 110 is configured to provide a portion of the fuel exhaust stream to the ATO reactor 116 via ATO input conduit 114 and recycle a portion of the fuel exhaust stream via recycling conduit 120. The portion of fuel exhaust provided to the ATO reactor 116 and recycled via recycling conduit 120 may vary between 10 and 90%. For example 10% of the fuel exhaust may be provided to the ATO reactor 116 and 90% recycled. Alternatively, 50% of the fuel exhaust may be provided to the ATO reactor 116, while 50% is recycled. Additionally, 90% of the fuel exhaust or more may be provided to the ATO reactor, while 10% or less is recycled. The amount of recycled fuel provided into conduit 120 is controlled by recirculation blower 122 power or blowing speed. The fuel exhaust stream provided into conduits 114 and 120 may contain the same composition or content of hydrogen, carbon monoxide, water, and carbon dioxide. Air exhaust conduit 112 is configured to provide the air exhaust stream to the ATO reactor 116.

The ATO reactor 116 receives the fuel exhaust stream and air exhaust stream via ATO input conduit 114 and conduit 112, respectively. The ATO reactor uses the combined fuel exhaust stream and air exhaust stream to oxidize anode tail gas and output heated oxidized fuel (i.e., reactor exhaust) to ATO exhaust conduit 118.

The recirculation blower 122 is coupled to recycling conduit 120 to provide the recycled fuel exhaust stream from recycling conduit 120 to the $CO_2$ separator 326, via recycling conduit 124. The recirculation blower 122 may be computer or operator controlled and may vary the amount and/or rate of the recycled fuel exhaust stream being provided to the $CO_2$ separator 326 and also the amount and/or rate of the carbon dioxide free or carbon dioxide depleted recycled fuel exhaust stream being provided back to the stack 106. As such, the recirculation blower 122 may be used to increase or decrease the overall recycling rate in system 100.

The carbon dioxide separator 326 may be a carbon dioxide membrane separator according to some embodiments. The system 100 may utilize ATO exhaust or SOFC cathode exhaust to sweep the collection side of the carbon dioxide separator 326 to remove carbon dioxide. The system 100 may bias the carbon dioxide separator 326 collection side gas with water.

Recycling conduit 124 may be coupled to the carbon dioxide separator 326. The recycled fuel exhaust stream is input to the carbon dioxide separator 326 via the recycling conduit 124, and carbon dioxide is removed from the recycled fuel exhaust stream to produce a purified (e.g., carbon dioxide depleted) recycled fuel exhaust stream. The purified recycled fuel exhaust stream exiting the carbon dioxide separator 326 contains less carbon dioxide than the recycled fuel exhaust stream that entered the carbon dioxide separator 326 via the recycling conduit 124. As a percentage of overall composition the purified recycled fuel exhaust stream contains a greater percentage of hydrogen than the recycled fuel exhaust stream entering the carbon dioxide separator 326 via recycling conduit 124. Preferably, the carbon dioxide separator 326 removes substantially all the carbon dioxide from the recycled fuel exhaust stream. The carbon dioxide separator 326 may remove less than 50%, or more than 50%, such as 50% to 60%, 60% to 70%, 70% to 80%, 80% to 90%, or 90% to 100%, such at about 98%, about 99%, or about 99.5% of the carbon dioxide from the recycled fuel exhaust stream.

The carbon dioxide separator 326 is coupled to recycling conduit 334. The purified recycled fuel exhaust stream, with a reduced amount of carbon dioxide, is provided back to the fuel inlet stream by the recycling conduit 334. The recycling of reduced carbon dioxide fuel exhaust into the fuel inlet increases the performance of the fuel cell stack 106.

The efficiency of the carbon dioxide separator 326 at selecting for carbon dioxide is increased by the biasing of the collection side of the carbon dioxide separator 326 by adding water to the collection side (e.g., sweep side) of the carbon separator 326.

In one embodiment, the hot exhaust from the ATO reactor 116 is passed via hot exhaust conduit 118 to a cathode recuperator heat exchanger 336 where the ATO exhaust exchanges heat with the air inlet stream provided through air inlet conduit 104. The heat exchanger helps to raise the temperature of the air in air inlet conduit 104 and reduces the temperature of the ATO exhaust in conduit 118 such that it does not damage the membrane humidifier 328.

In an alternative embodiment, all or a portion of the SOFC cathode exhaust may be passed directly to the cathode recuperator heat exchanger 336. A valve 349 may direct cathode exhaust from conduit 112 to conduit 350. Valve 349 may alternatively be a splitter (not shown) configured to direct a portion of the cathode exhaust to conduit 350 and a portion of the cathode exhaust to the ATO reactor. Valve 351 may be configured to direct the cathode exhaust received from conduit 350 toward the cathode recuperator heat exchanger 336 and prevent cathode exhaust from flowing to the ATO reactor 116. Additionally, valve 351 may be coupled to a conduit 352 to direct ATO exhaust and/or SOFC cathode exhaust out of the system 100 as exhaust. The utilization of valves 349 and 351 and conduit 350 may allow either SOFC cathode exhaust or ATO exhaust, a mixture of both ATO exhaust and SOFC cathode exhaust, or neither ATO exhaust nor SOFC cathode exhaust to pass to the cathode recuperator heat exchanger 336.

From the heat exchanger 336, the ATO exhaust conduit 118 may be coupled to an optional membrane humidifier 328. Air is input to the membrane humidifier 328 via conduit 118. Optionally, air may also be input to the membrane humidifier as via air conduit 340 coupled to the membrane humidifier 328. Air conduit 340 may input air supplied by a blower, fan, or compressor (not shown).

In operation, the membrane humidifier 328 humidifies an air or oxidized fuel stream for input into the carbon dioxide separator 326. The membrane humidifier 328 may comprise a polymeric membrane humidifier.

Water may be input to the membrane humidifier 328 via a water conduit 342 as necessary. Water is also may be collected by the membrane humidifier 328 from the carbon dioxide conduit 332, which is coupled between the carbon dioxide separator 326 and the membrane humidifier 332. The water permeates across the membrane from product side 328B to collection side 328A of membrane humidifier 328. The water from the conduit 342 is mixed in the membrane humidifier 328 with the ATO exhaust from conduit 118 and the now humid air passes to humid air conduit 330.

Humid air conduit 330 is coupled to the carbon dioxide separator 326 and the humid air or ATO exhaust is used to bias the separation of carbon dioxide by the carbon dioxide separator 326. Where a traditional carbon dioxide separator naturally selects for water in a reaction, the presence of water on the sweep side of the carbon dioxide separator reduces the selection of water and increases the efficiency of the carbon dioxide separator to select for carbon dioxide. In this manner the increased amount of water in the air entering the collection side of the carbon dioxide separator 326 biases the carbon dioxide separator 326 to select for carbon dioxide from the recycled fuel exhaust stream. Preferably, the humid air or ATO exhaust contains a substantially equal amount of water as the recycled fuel exhaust stream. The humid air or ATO exhaust may contain about 90%, 80%, 70%, 60%, 50%, 40%, 30%, 20%, or 10% of the water contained in the recycled fuel exhaust stream. The term "about" provides a variation based on given processes variables, such as a variation of 10% or less, preferably 5% or less. The humid air or ATO exhaust may also contain more than 100% of the water contained in the recycled fuel exhaust stream, such as about 110%, 120%, 130%, 140%, 150%, 160%, 170%, 180%, 190%, or 200%.

Thus conduit 330 inputs a humid mix into the collection side 326A and conduit 332 outputs a carbon dioxide and humid mix from the collection side 326A of carbon dioxide separator 326. Conduit 124 inputs the recycled fuel exhaust into the product side 326B (e.g., feed side) and conduit 334 outputs carbon dioxide depleted exhaust from the product side 326B of carbon dioxide separator 326.

Thus, conduits 340 and/or 118 provide an oxidizer to the collection side 328A and conduit 330 outputs a humidified oxidizer from the collections side 328A of membrane humidifier 328. Conduit 332 inputs carbon dioxide and humid mix into product side 328B and conduit 338 outputs carbon dioxide and from the product side 328B.

The humid air or ATO exhaust and carbon dioxide mixture travels from the collection side of the carbon dioxide separator via carbon dioxide conduit 332 to the membrane humidifier 328. The membrane humidifier 328 removes a portion of the water from the humid air mixture, and outputs carbon dioxide and air via output conduit 338. As discussed above, the water removed from the carbon dioxide conduit 332 by the membrane humidifier 328 may be used to humidify air or ATO exhaust entering the membrane humidifier 328. Thus, system 100 uses ATO exhaust or SOFC cathode exhaust to sweep the carbon dioxide separator collection side and/or to bias the collection gas with water.

Figure 2:
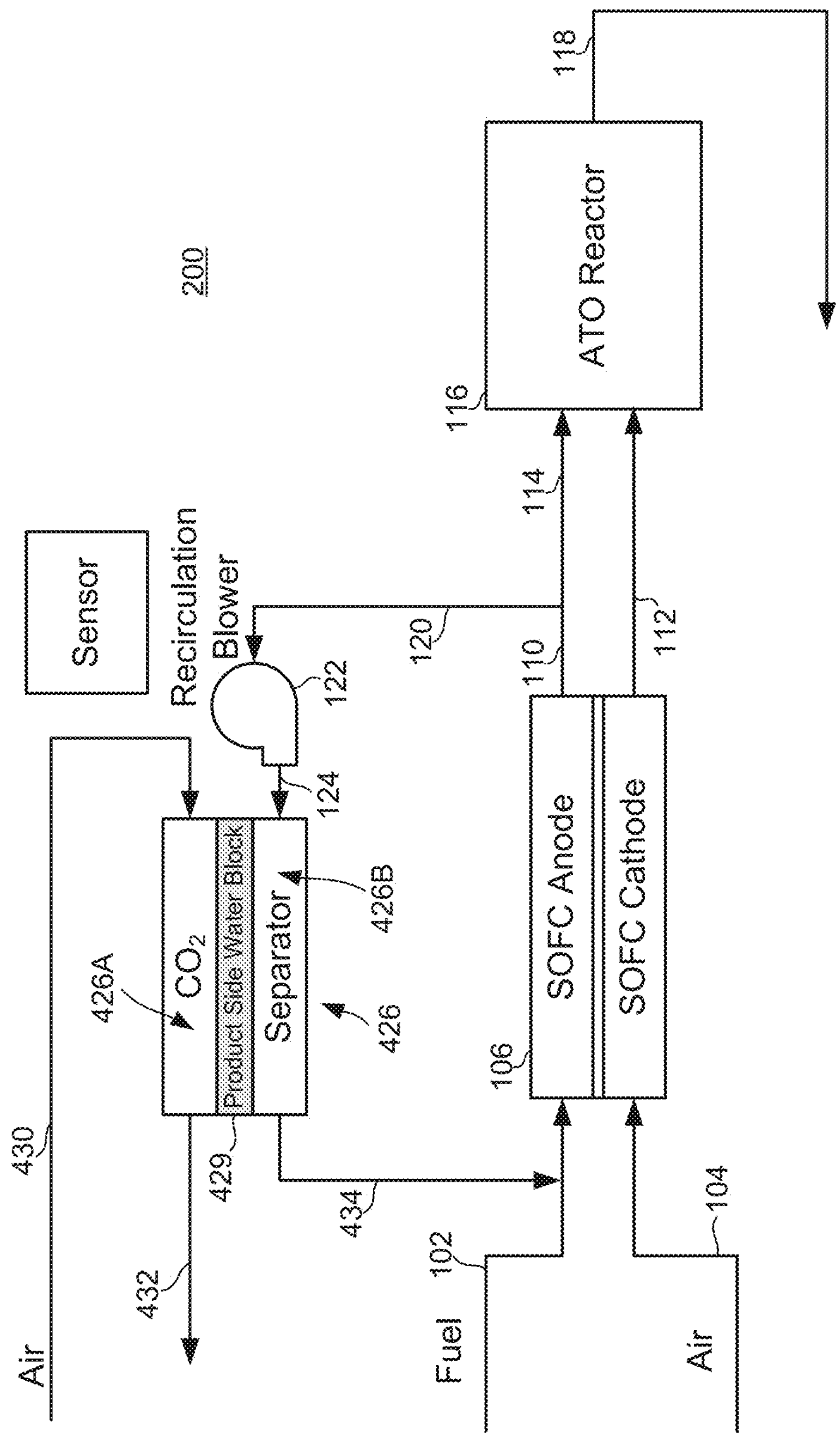

FIG. 2 illustrates a system 200 according to an embodiment of the invention. The system 200 is similar to system 100 illustrated in FIG. 1 and contains a number of components in common. Those components which are common to both systems 100 and 200 are numbered with the same numbers in FIGS. 1 and 2, and will not be described in detail.

One difference between systems 100 and 200 is that system 200 may utilize a different carbon dioxide membrane separator 426. The carbon dioxide membrane separator 426 may be a carbon dioxide membrane separator constructed with tailored membrane structure 429 to block water transport from the product side 426B (i.e., input side or feed side) to the collection side (i.e., sweep side) 426A of the carbon dioxide membrane separator. The tailored membrane structure (i.e., the product side water block) 429 may be constructed of a material which allows carbon dioxide to pass, but will not allow water to pass. One such material which has been found to be effective for product side water block construction is polytetrafluoroethylene (Teflon®). The product side water block impedes water transport via accumulation or blockage into the purging air of the carbon dioxide membrane separator. The carbon dioxide membrane separator 426 may be constructed in a manner similar to an electrochemical carbon dioxide separator, but does not require the input of electrical current to operate.

Recycling conduit 124 may be coupled to the carbon dioxide membrane separator 426. The recycled fuel exhaust stream enters the product side 426B of the carbon dioxide membrane separator 426 via recycling conduit 124. The carbon dioxide membrane separator removes carbon dioxide from the recycled fuel exhaust stream. As previously discussed, the product side water block 429 of the carbon dioxide membrane separator impedes the transport of water, so only carbon dioxide is collected by the carbon dioxide membrane separator 426 on the collection side 426A. Preferably, the carbon dioxide membrane separator 426 removes substantially all the carbon dioxide from the recycled fuel exhaust stream. The carbon dioxide membrane separator 426 may remove less than 50% or greater than 50%, such as 50% to 60%, 60% to 70%, 70% to 80%, 80% to 90%, or 90% to 100%, such as about 98%, about 99%, or about 99.5% of the carbon dioxide from the recycled fuel exhaust stream.

The purified recycled fuel exhaust stream exiting the product side 426B of the carbon dioxide membrane separator 426 contains less carbon dioxide than the recycled fuel exhaust stream that entered the product side 426B of the carbon dioxide separator 426 via the recycling conduit 124. As a percentage of overall composition the purified recycled fuel exhaust stream contains a greater percentage of hydrogen than the recycled fuel exhaust stream entering the carbon dioxide separator 426 via recycling conduit 124.

The product side 426B of the carbon dioxide membrane separator 426 is coupled to recycling conduit 434. The purified recycled fuel exhaust stream, with a reduced amount of carbon dioxide, is provided back to the fuel inlet stream by the recycling conduit 434. The recycling of reduced carbon dioxide fuel exhaust into the fuel inlet increases the performance of the fuel cell stack 106.

Purge air is provided to the collection side 426A of the carbon dioxide membrane separator 426 via air conduit 430 which is operatively coupled to the collection side 426A of the carbon dioxide membrane separator 426. Purge air removes carbon dioxide from the collection side 426A of the carbon dioxide membrane separator 426. The carbon dioxide membrane separator 426 is operatively coupled to output conduit 432 and the air and carbon dioxide mixture flows from the collection side 426A of the carbon dioxide membrane separator 426 to the output conduit 432.

Figure 3:
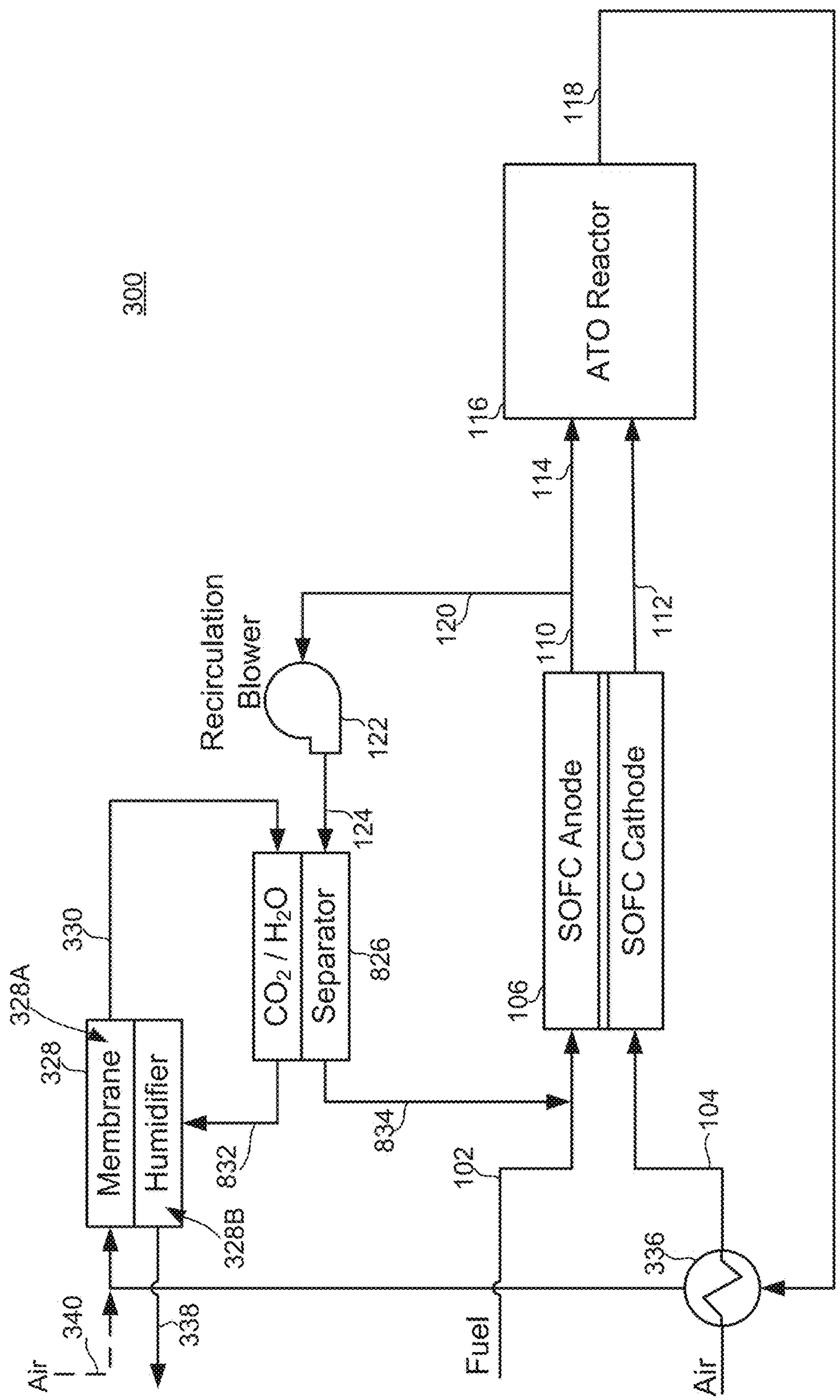

FIG. 3 illustrates a system 300 according to an embodiment of the invention. The system 300 is similar to system 100 illustrated in FIG. 1 and contains a number of components in common. Those components which are common to both systems 100 and 300 are numbered with the same numbers in FIGS. 1 and 3 and will not be described further.

One difference between systems 300 and 100 is that system 300 utilizes a combination carbon dioxide and water separator 826 rather than only a carbon dioxide separator 326. The combination carbon dioxide and water separator 826 operates to produce a purified recycled fuel exhaust stream containing less carbon dioxide and less water to recycle to the fuel cell stack 106, with the carbon dioxide and water are removed at the same time. The combination carbon dioxide and water separator 826 continuously removes carbon dioxide and water from the recycled fuel exhaust stream.

The combination carbon dioxide and water separator 826 receives the recycled fuel exhaust stream via recycling conduit 124. The combination carbon dioxide and water separator 826 removes carbon dioxide and water from the recycled fuel exhaust stream to produce a purified recycled fuel exhaust stream. The purified recycled fuel exhaust stream is passed from combination carbon dioxide and water separator 826 to recycling conduit 834.

The purified recycled fuel exhaust stream exiting the combination carbon dioxide and water separator 826 contains less water than the recycled fuel exhaust stream that entered the combination carbon dioxide and water separator 826 via recycling conduit 124. Compared to the fuel exhaust stream originally exiting the fuel cell stack 106 via fuel exhaust conduit 110, the purified recycled fuel exhaust stream exiting the combination carbon dioxide and water separator 834 via recycling conduit 834 contains less water and less carbon dioxide overall. The removal of carbon dioxide and water results in the purified recycled fuel exhaust stream in recycling conduit 828 having an increased proportion of both hydrogen and carbon monoxide as a percentage of volume when compared to the fuel exhaust stream originally exiting the fuel cell stack 106 via the fuel exhaust conduit 110.

The purified recycled fuel exhaust stream exits the combination carbon dioxide and water separator 826 via recycling conduit 834 and the purified recycled fuel exhaust stream is provided back to the fuel inlet stream by the recycling conduit 834. The recycling of reduced carbon dioxide fuel exhaust into the fuel inlet increases the performance of the fuel cell stack 106 and the reduction of water optimizes the steam to carbon ratio and increases cell performance.

The water and carbon dioxide removed from the combination carbon dioxide and water separator 826 mixes with purge air received from humid air conduit 330 and exits the combination carbon dioxide and water separator 826 via carbon dioxide conduit 832. The membrane humidifier 328 removes water from the carbon dioxide, water, and air mixture received via carbon dioxide conduit 832. The water removed by the membrane humidifier 328 may be used to humidify the input air to the membrane humidifier 328. In this manner, the need for water conduit 342 present in system 300 may be eliminated.

Figure 4:
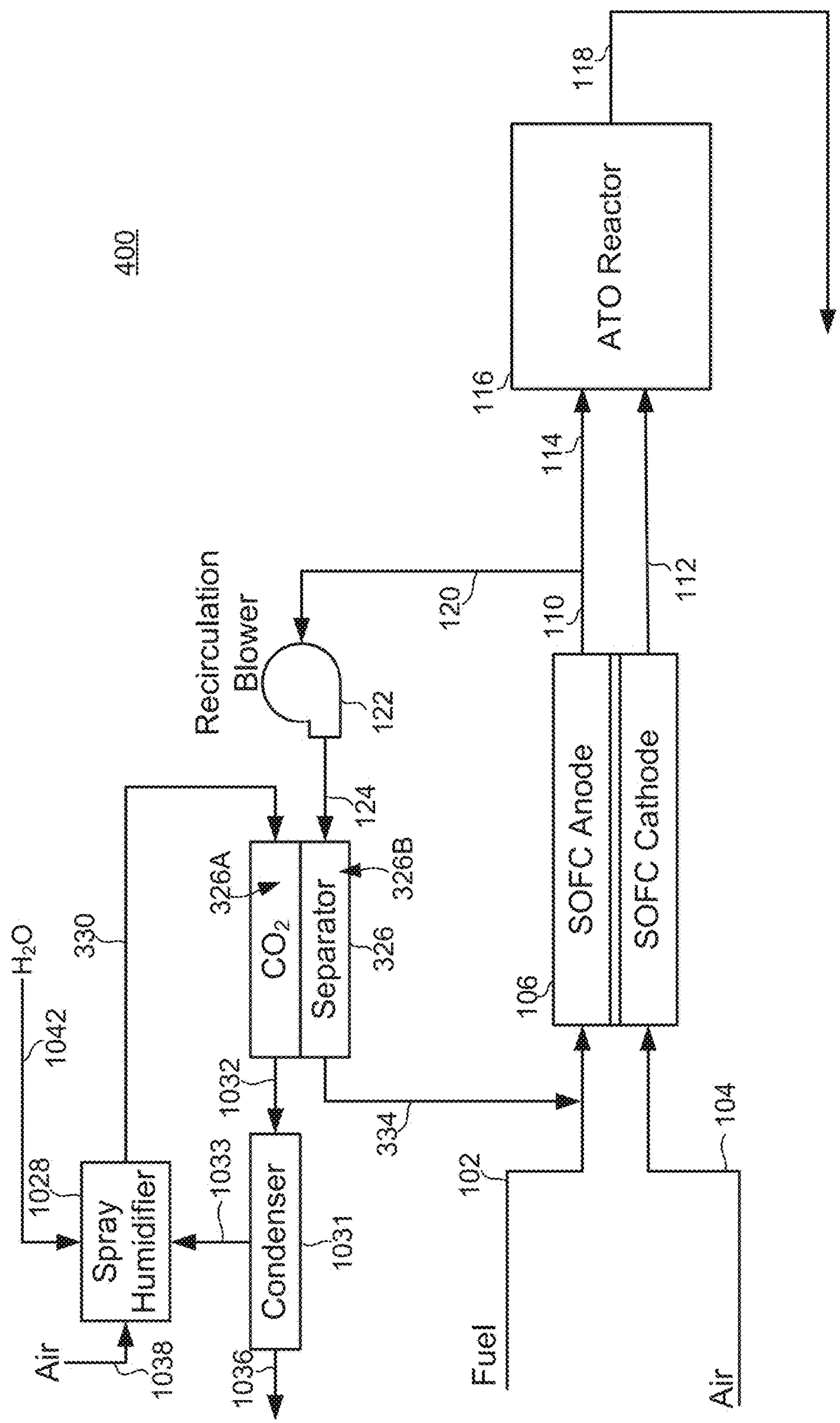

FIG. 4 illustrates a system 400 according to an embodiment of the invention. The system 400 is similar to system 100 illustrated in FIG. 1 and contains a number of components in common. Those components which are common to both systems 100 and 400 are numbered with the same numbers in FIGS. 1 and 4 and will not be described further.

One difference between systems 100 and 400 is that system 400 utilizes spray humidifier 1028 to bias carbon dioxide separator 326 by adding water to the collection side 326A of the carbon dioxide separator 326, rather than the membrane humidifier 328 of system 300. Additionally, in system 400 the air conduit 118 need not be connected to the spray humidifier 1042.

The spray humidifier 1028 is used to add water to the air that will be input to the collection side 326A of the carbon dioxide separator 326.

Air is input to the spray humidifier 1028 via air conduit 1038. Water may be input to the spray humidifier 1028 via a water conduit 1042. Water may also be input to the spray humidifier via water conduit 1033. Water is sprayed into the air input into the spray humidifier 1028 and mixes with the air to produce humid air. The now humid air passes to humid air conduit 330.

Humid air conduit 330 is coupled to the collection side 326A of the carbon dioxide separator 326 and the humid air is used to bias the separation of carbon dioxide by the carbon dioxide separator 326. Where a traditional carbon dioxide separator naturally selects for water in a reaction, the presence of water on the collection side of the carbon separator reduces the selection of water and increases the efficiency of the carbon dioxide separator to select for carbon dioxide. In this manner the increase amount of water in the air entering the carbon dioxide separator 326 biases the collection side 326A of the carbon dioxide separator 326 to select for carbon dioxide from the recycled fuel exhaust stream.

The humid air and carbon dioxide mixture travels from the carbon dioxide separator via carbon dioxide conduit 1032 to a condenser 1031. The condenser 1031 removes a portion of the water from the humid air and carbon dioxide mixture, and outputs carbon dioxide and air via output conduit 1036. The water collected in the condenser 1031 may be provided to water conduit 1033 and input to the spray humidifier 1028.

Figure 5:
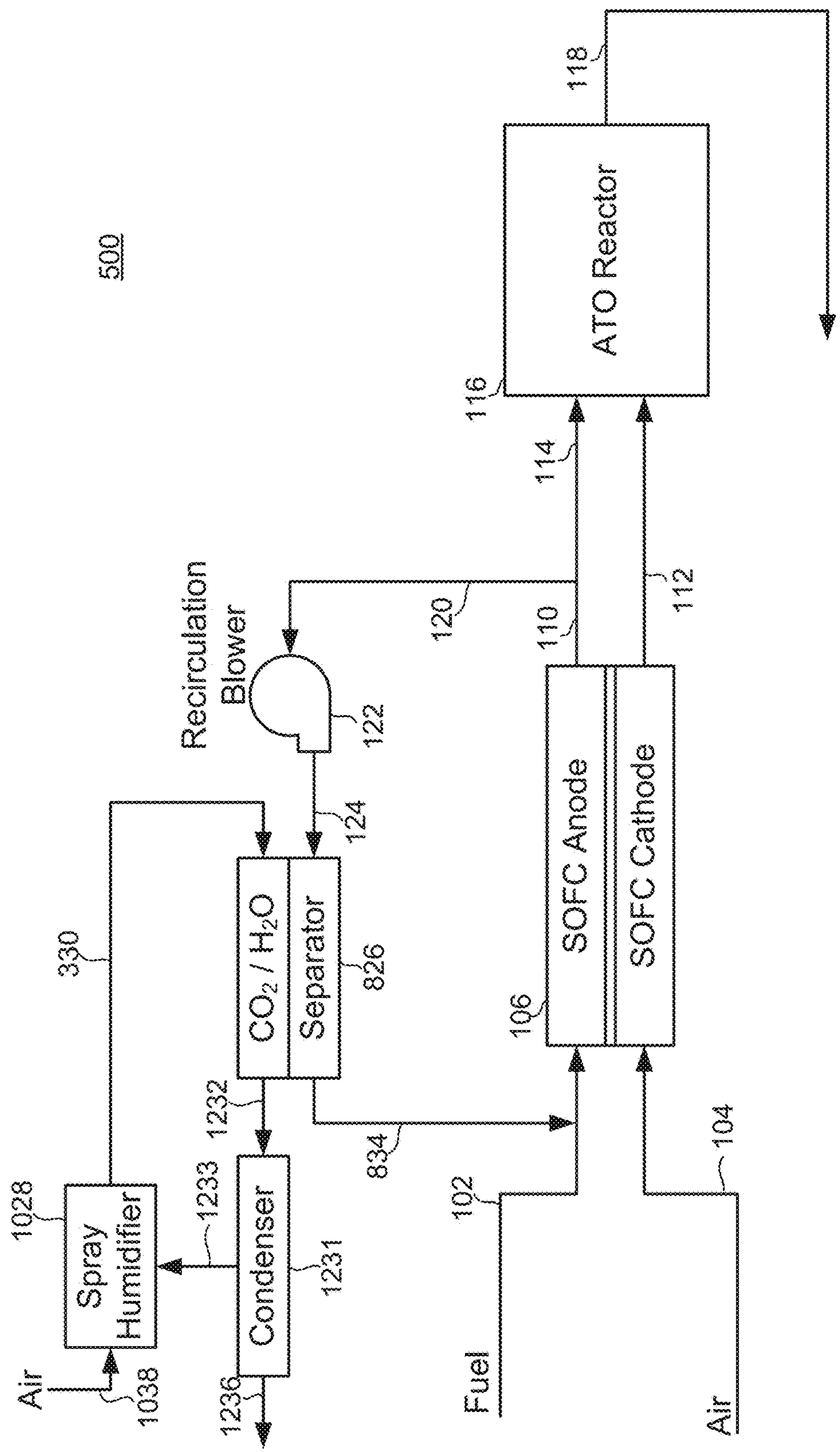

FIG. 5 illustrates a system 500, according to an embodiment of the invention. The system 500 is similar to system 300 illustrated in FIG. 3 and contains a number of components in common. Those components which are common to both systems 500 and 300 are numbered with the same numbers in FIGS. 3 and 5 and will not be described further.

One difference between systems 300 and 500 is that system 500 utilizes spray humidifier 1028 to bias the combination carbon dioxide and water separator 826 by adding water to the collection side of the combination carbon dioxide and water separator 826, rather than utilizing the membrane humidifier 328 of system 300. Additionally, in system 500 the air conduit 118 need not be connected to the spray humidifier 1028. System 500 is a combination of systems 300 and 400 in that it contains the combination carbon dioxide and water separator 826 and the spray humidifier 1028.

The spray humidifier 1028 is used to add water to the air that will be input to the collection side of the carbon dioxide separator 826.

The water and carbon dioxide removed from the combination carbon dioxide and water separator 826 mixes with purge air received from humid air conduit 330 and exits the combination carbon dioxide and water separator 826 via carbon dioxide conduit 1232.

Air is input to the spray humidifier 1028 via air conduit 1038. Water may be input to the spray humidifier 1028 via a water conduit 1233. Water is sprayed into the air input into the spray humidifier 1028 and mixes with the air to produce humid air. The now humid air passes to humid air conduit 330 to be provided to the collection side of the carbon dioxide and water separator 826.

The humid air and carbon dioxide mixture travels from the combination carbon dioxide and water separator 826 via carbon dioxide conduit 1232 to a water separator, such as the condenser 1231. The condenser 1231 removes a portion of the water from the humid air and carbon dioxide mixture, and outputs carbon dioxide and air via output conduit 1236. The water collected in the condenser 1231 may be provided to water conduit 1233 and input to the spray humidifier 1028.

Figure 6:
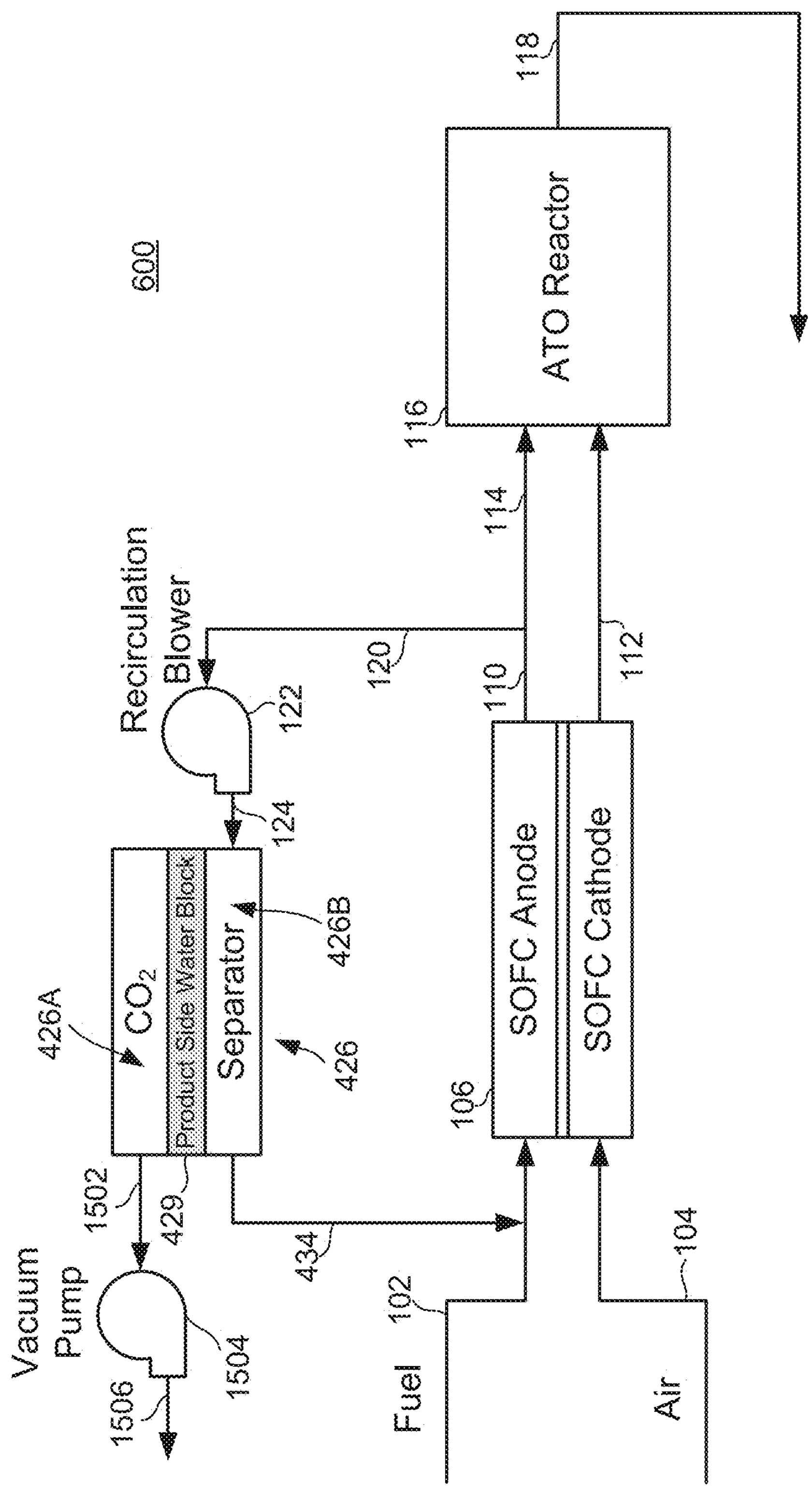

FIG. 6 illustrates a system 600 according to an exemplary embodiment of the invention. The system 600 is similar to system 200 illustrated in FIG. 2 and contains a number of components in common. Those components which are common to both systems 200 and 600 are numbered with the same numbers in FIGS. 2 and 6 and will not be described further.

One difference between systems 200 and 600 is that system 600 utilizes a vacuum pump 1504 to remove separated carbon dioxide from the collection side 426A of the carbon dioxide membrane separator 426 rather than purge air. The utilization of a vacuum pump 1504 may be more effective than purge air, and the parasitic power draw of the vacuum pump 1504 may not be so large as to overcome the benefit of using the vacuum pump 1504. An output conduit 1502 may be operatively connected to the collection side 426A of the carbon dioxide membrane separator 426. The output conduit 1502 may be operatively connected to the vacuum pump 1504. An output conduit 1506 may be coupled to the vacuum pump 1504. In operation, the vacuum pump 1504 may pull carbon dioxide from the collection side 426A of the carbon dioxide membrane separator 426 via output conduit 1502.

In alternative embodiments (not shown) nitrogen, steam, or argon rather than air may be used as the purge gas for carbon dioxide separators. Oxygen could be removed by injecting a small amount of waste fuel (carbon-free and including $H_2$, such as, forming gas or $H_2$ gas) into the sweep air stream and burning it, removing substantially all the oxygen. However, depending on the fuel source chosen and the system design, this strategy may not always be beneficial since more fuel might be consumed than is reclaimed. Oxygen could also be removed with an electrochemical cell ("oxygen pumping") with an oxide ion electrolyte and oxidation tolerant electrodes such as Pt. Alternative waste streams could also be used, such as oxygen-depleted air from the cathode exhaust of the fuel cell.

However, ambient air may be considered the most convenient, since it is freely available, requires little additional energy input, and is substantially free of $CO_2$ (<0.1%). However, ambient air may be substantially free of water vapor, creating a partial pressure gradient favoring water vapor removal through the membrane. Many suitable $CO_2$ removal membranes are also freely permeable to water vapor. So, a significant amount of water is removed from the system in addition to $CO_2$. Water is a byproduct of the fuel cell reaction, and so some water removal may be needed. However, some product water in the recirculation stream is useful, as it reacts with CO to form higher-heating value $H_2$ fuel in the water-gas shift reaction in the fuel cell, resulting in higher efficiency. Too little water will cause carbon deposits ("coking") that may irreversibly damage or destroy a fuel cell. Too much water acts as a diluent, reducing the partial pressure of the fuel reactants, and reducing overall efficiency of the fuel cell.

The desired water to fuel balance is typically expressed as O:C (oxygen-to-carbon ratio), where oxygen is the sum of the concentrations of ($H_2O$+CO+2*$CO_2$) and carbon is the sum of ($CH_4$+CO+$CO_{2+n}$*$C_nH_x$), where $C_nH_x$ are higher hydrocarbons, such as ethane, propane, butanes, etc. The O:C ratio entering the fuel cell may be about 1.9-2.0. So, the amount of water removed by the membrane may be such that the "retentate stream" (what remains in the exhaust of the feed side of the $CO_2$ membrane) has an O:C of 1.9-2.0, after it has been mixed with fresh fuel.

This water removal rate depends on membrane temperature, feed and sweep gas water content and flow rates, and reactor design (co-flow vs. counter flow). The membrane operating temperature, typically 105° C.-140° C., is constrained by many factors: the temperature should not fall below 100° C. to prevent condensation of water, and the anode recirculation stream should be cooled as little as possible, since it will have to be reheated before re-introducing it back to the fuel cell. Membrane transport performance generally increases with temperature. However, permeation can decrease due to increased water loss from the membrane at high temperature, and a polymeric membrane cannot tolerate too high of a temperature without physical degrading. Feed gas water content is generally fixed by the system operating conditions. So, the water removal rate should be controlled by either decreasing the water permeability, or suppressing water transport across the membrane, by decreasing the partial pressure gradient.

If the sweep gas is humidified, then the partial pressure gradient is decreased, and the water permeation decreases. According to some embodiments, the dew point of the sweep gas may range from 50° C. to 85° C., and in some designs, a 70° C. dew point may be used. The sweep gas can be humidified with either an external source of water, or by using a source of water internal to the system such as condensed product water. A membrane humidifier 328 using a water-permeable material such as Nafion can be used, a spray humidifier 1028, a steam generator, or an alternating series of water-absorbing beds such as zeolites can be used to humidify the sweep gas stream. For example, a two bed system may be used where a first bed is used to humidify the sweep gas stream while a second bed is humidified, until the moisture content of the first bed is reduced, and then the process is reversed using the second bed for humidification of the sweep gas stream.

A counterflow design has the advantage of increased exchange of $CO_2$, but the disadvantage of increased undesirable exchange of water. Depending on the amount of membrane area and how much $CO_2$ removal is necessary, a co-flow design can be used. This will decrease the $CO_2$ and $H_2O$ permeation by suppressing the average partial pressure gradient across the membrane. Modeling suggests that removing only half the $CO_2$ from the anode gas recycle loop results in more than 75% of the efficiency gain of removing all the $CO_2$, with the advantage of striking an ideal water balance.

According to some embodiments, it is advantageous to detect the water removal rate and use this data in the controls system to make adjustments to strike the ideal water balance. Methods of detection include: humidity sensor on feed/sweep inlet or exhaust; exhaust temperature measurement (if the $CO_2$ membrane is below 100° C.—assuming gas is fully saturated at that temperature).

Methods to control the water removal rate include: adjusting the sweep gas flow rate (more flow=more water removal); adjusting the $CO_2$ membrane temperature (higher temperature=more water removal); adjusting anode recycle flow rate; and adjusting sweep inlet humidification with an external humidifier (e.g., changing the temperature of the water bath in a membrane humidifier). As shown in FIG. 1, the fuel cell system 100 may include a controller 121 and a sensor 123 configured to detect the temperature of the $CO_2$ membrane, the humidity/dew point and/or flow rate of the sweep gas, the humidity/dew point and/or flow rate of the fuel exhaust stream, and the like. The controller 121 may be configured to control the water removal rate, based on the output of the sensor 123, by controlling various other components of the fuel cell system 100.

It may be advantageous to startup and shutdown in a moist or condensing environment. Such an environment ensures that the membrane does not dehydrate, which could negatively impact the permeation performance. If the environment may be condensing, hydrophobic barrier layers may also be employed to protect the membrane from liquid water. An appropriately moist environment may be achieved by simply using valves at the inlet and exhaust of the feed and sweep sides to isolate the membrane when the system is in standby. Water could also be injected with an external humidifier before the membrane is isolated.

With regard to the above carbon dioxide membrane separators, suitable membranes exhibit a high permeance of carbon dioxide (flux of carbon dioxide flow per unit area per unit partial pressure gradient) as well as a high selectivity (low diffusion of other species including $CO_2$, $H_2$, and $N_2$). Such membranes include crosslinked polyvinylalcohol (PVA) membranes containing amines such as AIBA (2-aminoisobutyric acid)-potassium salts ("AIBA-K"), potassium carbonate-potassium bicarbonate, glycine-potassium salts ("glycine-K"), and/or fixed poly(allylamine) carriers. Other membranes include supported liquid membranes (SLMs), such as immobilized aqueous bicarbonate-carbonate membranes or immobilized alkaline liquid films, supported molten salt membranes, or ion-exchange membranes such as Nafion membranes that contain amines, sulfonated styrene-divinylbenzene in fluorinated matrices, acrylic acid membranes with diamene carriers, and many others. See: J. Zou, W. S. W. Ho, Journal of Membrane Science 286 (2006), pgs. 310-321, which is incorporated by reference for purposes of describing the membranes.

As noted above, ambient air may be used as a sweep gas, since it is freely available, requires little additional energy input, and is substantially free of carbon dioxide (<0.1%). However, oxygen in air can have undesirable effects on the membrane performance. For example, many amine-based chemistries, such as AIBA-K or glycine-K, oxidize in ambient air at the membrane operating temperature. The membrane operating temperature, typically 105° C.-140° C., is constrained by many factors: the temperature should not fall below 100° C. to prevent condensation of water, and the anode recirculation stream should be cooled as little as possible, since it will have to be reheated before re-introducing to the fuel cell. Membrane transport performance generally increases with temperature. However, permeation can decrease due to increased water loss from the membrane at high temperatures, and the polymeric membrane cannot tolerate too high of a temperature without physically degrading.

Without wishing to be bound to a particular theory, it is believed that carbon dioxide separator membrane degradation occurs because the active amine sites of the membrane react irreversibly with oxygen, resulting in the decrease of free carbon dioxide carriers. The higher the temperature, and the higher the oxygen concentration, the more rapid the degradation. Oxygen from the sweep air (purge gas) therefore will decrease the permeability of the membrane, degrading performance and resulting in less carbon dioxide permeation and lower efficiency in the membrane.

Figure 7:
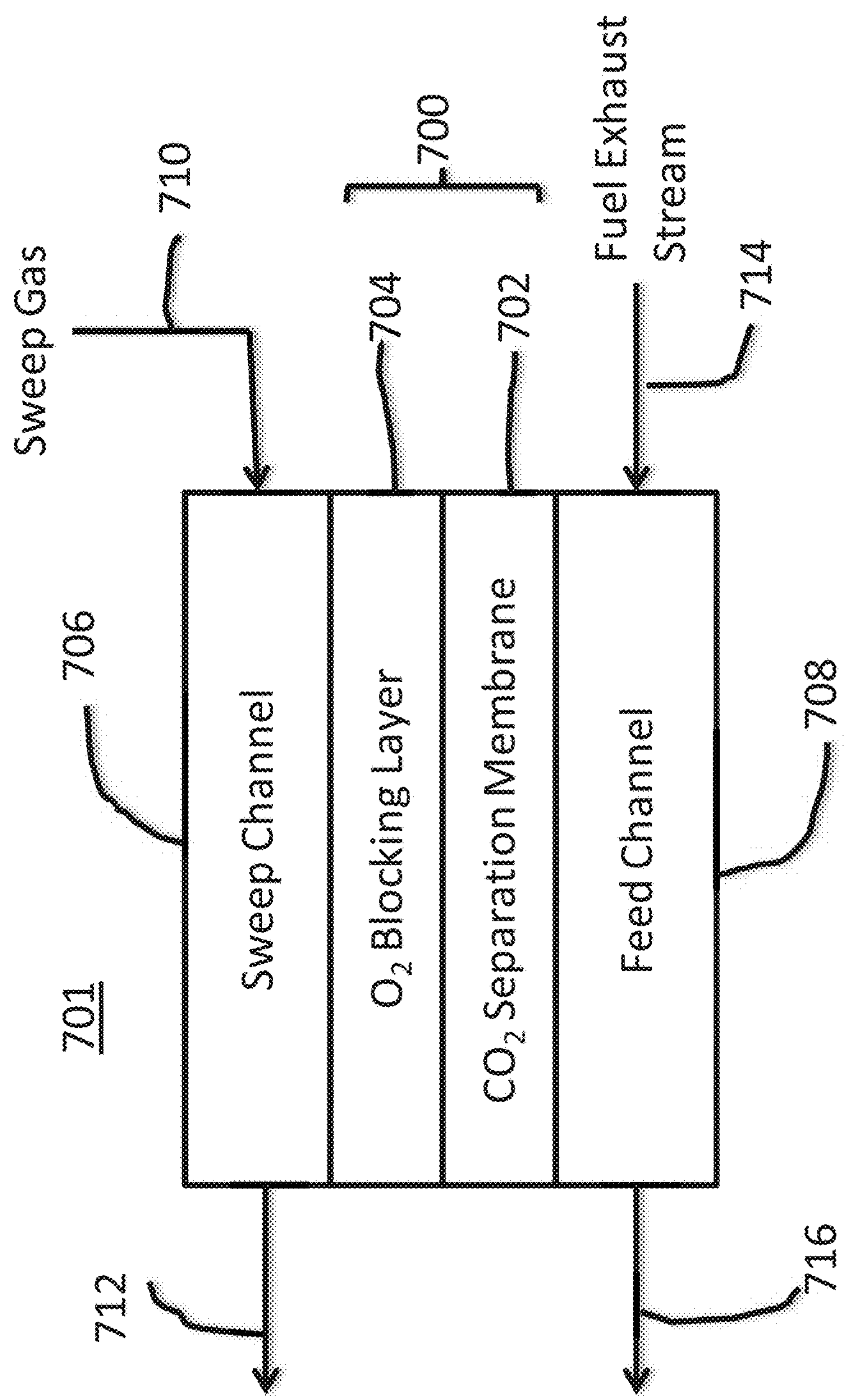
FIGS. 7-10 are schematics of carbon dioxide separators capable of use with various embodiments the present invention.

FIG. 7 illustrates a carbon dioxide separator 701, according to an exemplary embodiment of the present invention. The carbon dioxide separator 701 includes a sweep channel 706, a feed channel 708, and a bi-layer membrane structure 700 disposed therebetween. A sweep gas is supplied to the sweep channel 706 through a sweep gas supply conduit 710. The sweep gas supply conduit may also be referred to as an air conduit. The sweep gas is exhausted from the sweep channel 706 through a sweep gas exhaust conduit 712. The sweep gas exhaust conduit may also be referred to as a carbon dioxide conduit.

A fuel exhaust stream is supplied to the feed channel 708 from the fuel cell stack, through a first recycling conduit 714. The fuel exhaust stream is exhausted from the feed channel 708 through a second recycling conduit 716. The second recycling conduit 716 may be connected to a fuel inlet conduit connected to a fuel cell stack, as described above.

The carbon dioxide separator 701 may be one of the above carbon dioxide membrane separators, such as the carbon dioxide separator 326 shown in FIG. 1. Referring to FIG. 7, the membrane structure 700 includes a carbon dioxide separation membrane 702, which has a structure as described above. For example, the carbon dioxide separation membrane 702 may be an AIBA-K or glycine-K membrane. The carbon dioxide separation membrane 702 should be permeable to $CO_2$ and $H_2O$, and impermeable, or substantially impermeable, to $H_2$, CO, and $N_2$. In other words, carbon dioxide separation membrane 702 may have a relatively high permeability to $CO_2$ and $H_2O$, and a relatively low permeability to $H_2$, CO, and $N_2$.

However, since AIBA-K or glycine-K membranes are degraded by oxygen in air, the bi-layer membrane structure 700 also includes an oxygen blocking layer 704 disposed on the sweep (air) side of the bi-layer membrane structure 700. The oxygen blocking layer 704 may be permeable to $CO_2$ and $H_2O$, substantially impermeable to oxygen, while being tolerant to oxygen. The oxygen blocking layer 704 may be formed of polyethylene oxide (PEO) or any other suitable oxygen-tolerant polymer that is not degraded by oxygen. The oxygen blocking layer 704 does not necessarily have low permeability to CO and $H_2$, because the carbon dioxide separation membrane 702 already filters out these components. The oxygen blocking layer 704 may operate as a barrier layer that prevents oxygen from encountering the carbon dioxide separation membrane 702, which maintains the high $CO_2$ permeability of the carbon dioxide separation membrane 702. While a co-flow design is shown, a counter-flow design may also be used.

Furthermore, some oxygen tolerance on the feed side may also be beneficial. Periodically, the fuel cell system may be shutdown, either in an emergency, or in a controlled shutdown for maintenance. During a shutdown, the feed side (product side) of the membrane may be subjected to ambient air. Depending on the conditions of the shutdown, the temperature of the membrane may be high enough to degrade permeation performance when oxygen encounters the membrane. Therefore, it is beneficial to prevent the membrane from being oxidized on the anode feed side as well.

Figure 8:
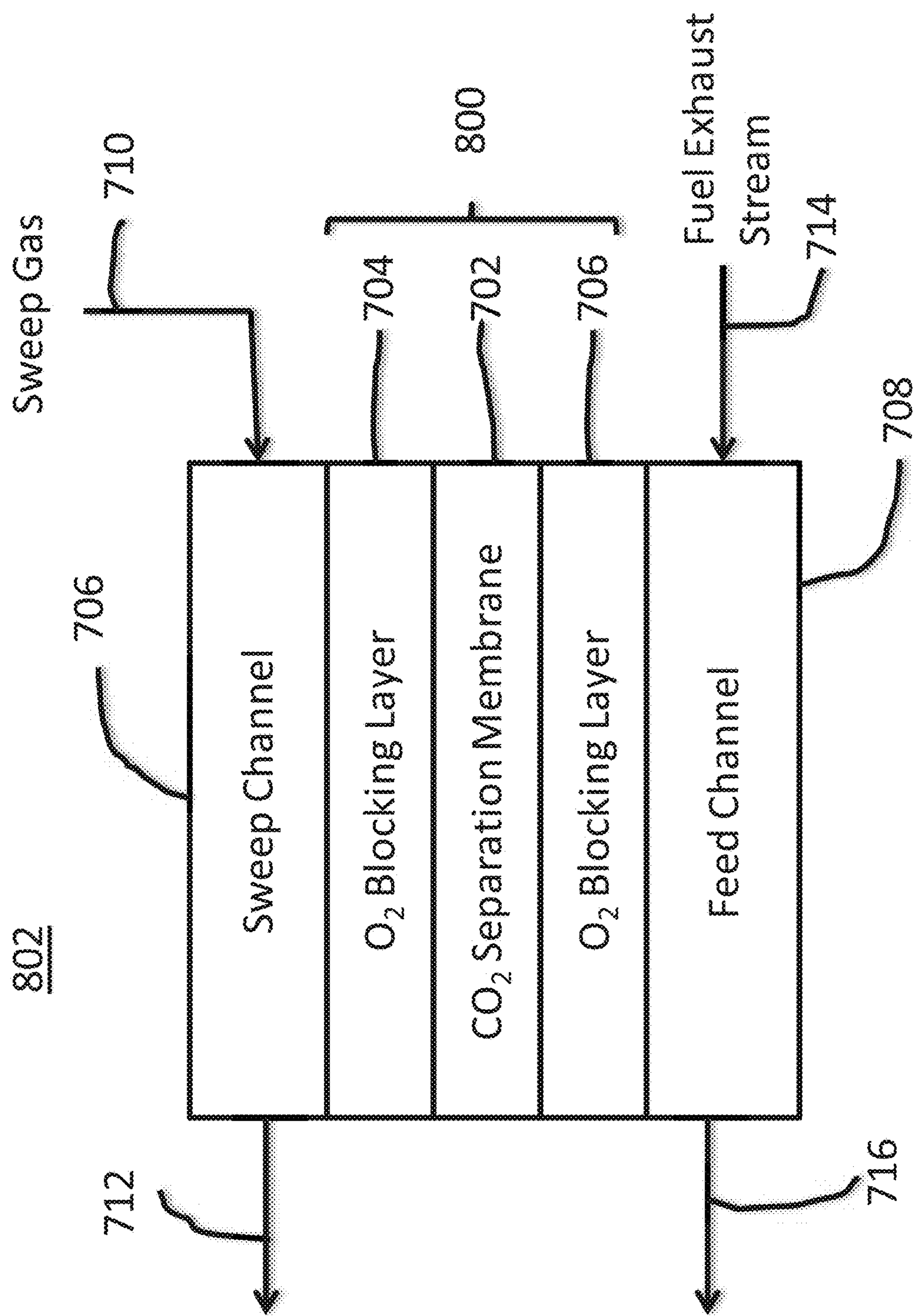

FIG. 8 illustrates a carbon dioxide separator 802 that is similar to the carbon dioxide separator of FIG. 7. As such, similar elements are designated with similar reference numbers, and only the differences therebetween will be described in detail. Referring to FIG. 8, the carbon dioxide separator 802 includes a tri-layer membrane structure 800, according to various embodiments. The membrane structure 800 additionally includes an oxygen blocking layer 706 disposed between the carbon dioxide separation membrane 702 and the sweep channel 706. The oxygen blocking layer 706 may be formed of PEO and/or have similar properties/structure to the oxygen blocking layer 704. The oxygen blocking layer 706 may prevent oxidation during shutdown or other instances of oxygen encountering the otherwise unprotected feed channel side of the membrane structure 800.

Lower temperatures are beneficial for the oxidation tolerance of many $CO_2$-permeable membranes, such as membranes having AIBA-K or glycine-K chemistries. The above membranes may be operated at temperatures as low as 60° C., in order to prevent oxidation by the sweep air. For example, the above membranes may be operated at temperatures ranging from 60° C. to 70° C. in some embodiments. Special care should be taken to prevent water condensation in the feed gas if temperatures below 100° C. are utilized.

In particular, many $CO_2$-permeable membranes may be irreversibly damaged by liquid water if it condenses from the feed or sweep stream. This may be due to washing away the salts which act as carriers, dissolution of the polymer backbone, or other reasons. A micro-porous or nano-porous (e.g., having an average pore size of less than 10 μm or less than 1 μm) hydrophobic layer such as ePTFE (Teflon with pores) can be used either as a support or as a protective barrier layer on either the feed side, the sweep side, or both feed and sweep side. This hydrophobic layer sheds any condensed liquid water and protects the membrane from damage.

Figure 9A:
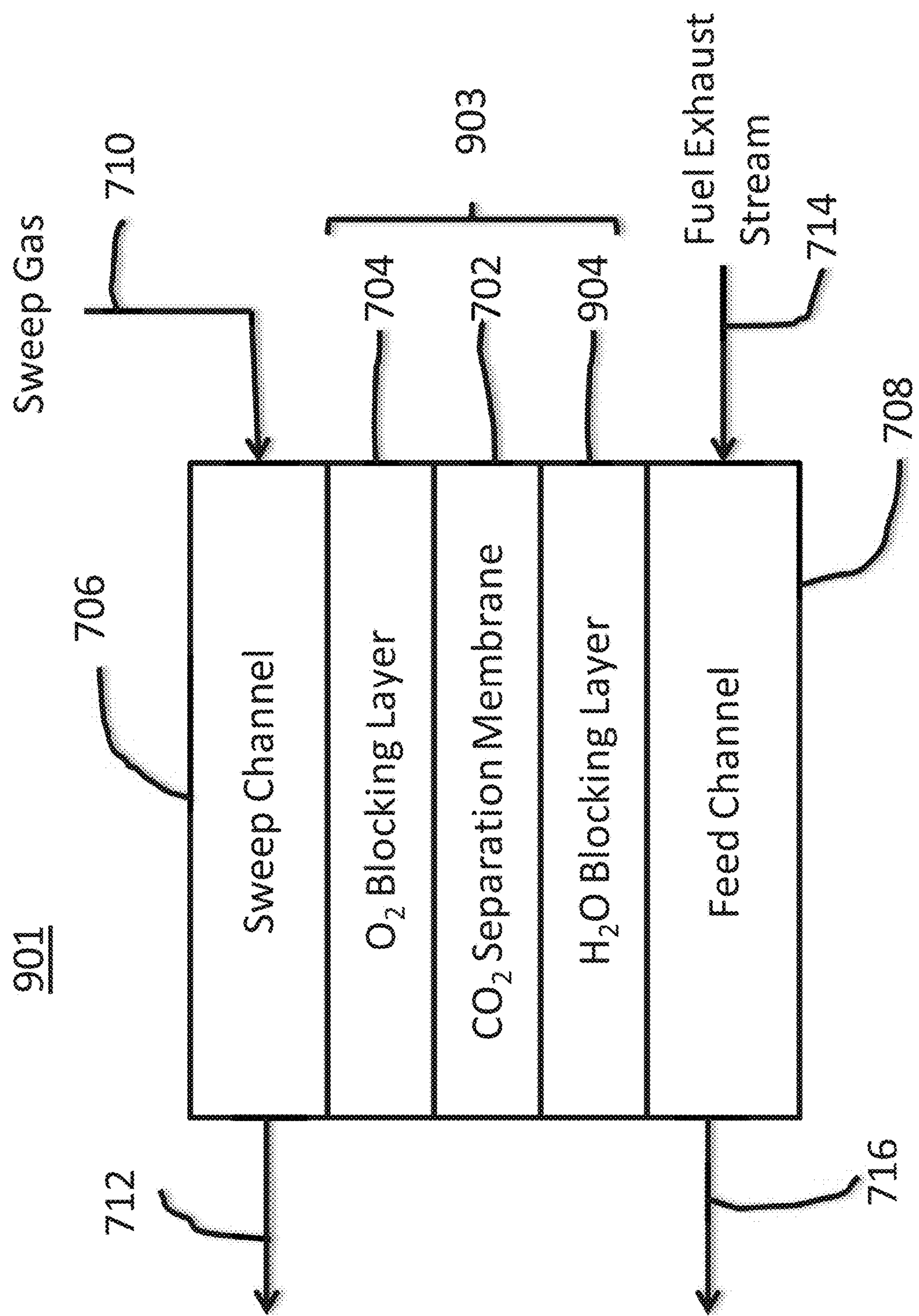

FIG. 9A illustrates a carbon dioxide separator 901 that is similar to the carbon dioxide separator 802 of FIG. 8. As such, similar elements are designated with similar reference numbers, and only the differences therebetween will be described in detail. Referring to FIG. 9A, the carbon dioxide separator 901 includes a membrane structure 903 configured to prevent water condensation, according to exemplary embodiments of the present disclosure. The membrane structure 903 includes a carbon dioxide separation membrane 702 as described above. In addition, the membrane structure 903 includes an oxygen blocking layer 704 on the sweep side and a water blocking layer 904 on the feed side configured to suppress water permeation across the carbon dioxide separation membrane 702. The water blocking layer 904 may be micro-porous, nano-porous, and/or hydrophobic. The water blocking layer 904 may be formed of, for example, porous Teflon (PTFE), polysulfone, or other suitable materials.

Figure 9B:
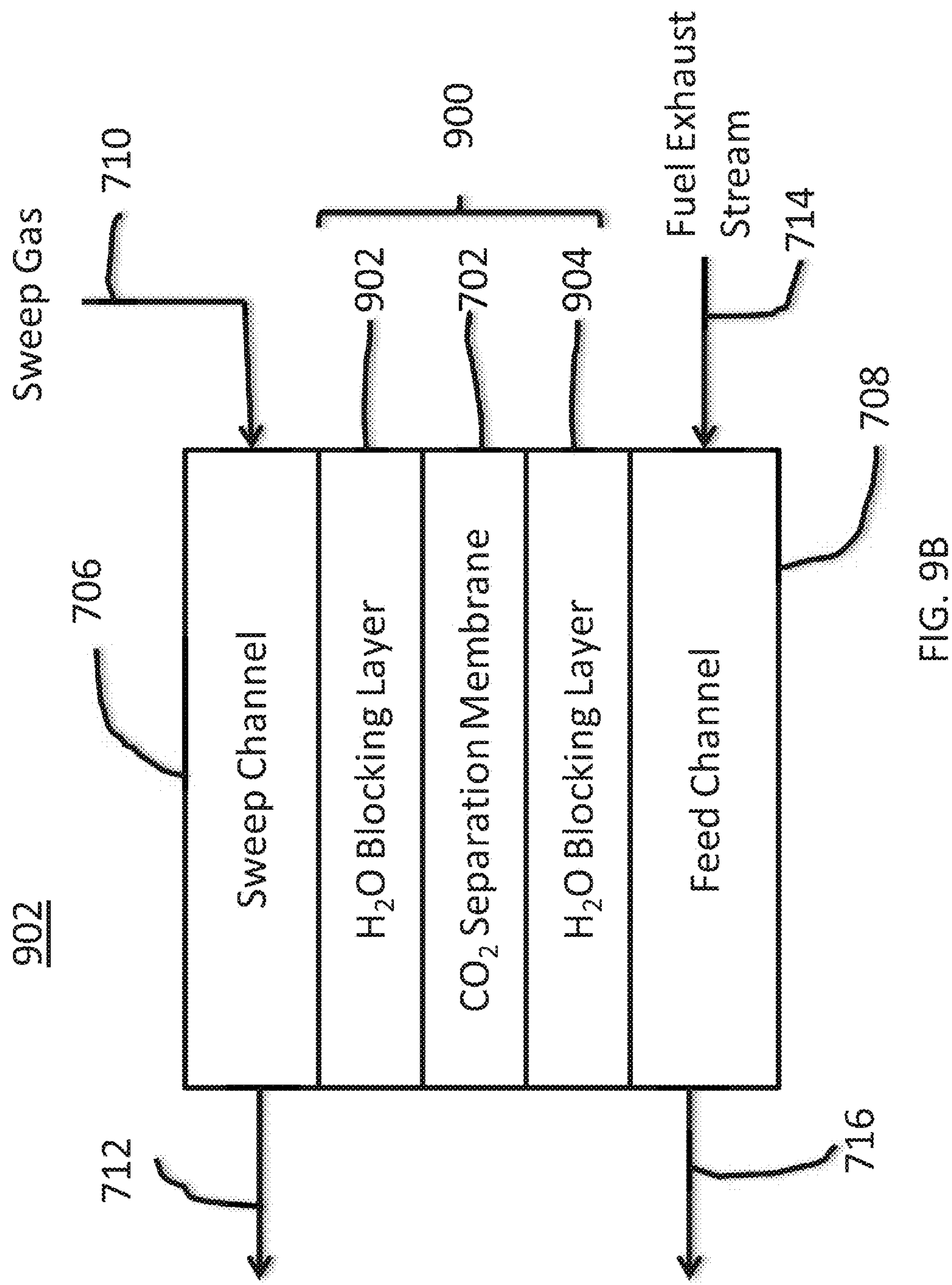

FIG. 9B illustrates a carbon dioxide separator 902 that is similar to the carbon dioxide separator 901 of FIG. 9A. As such, similar elements are designated with similar reference numbers, and only the differences therebetween will be described in detail. Referring to FIG. 9B, the carbon dioxide separator 902 includes a membrane structure 900 configured to prevent water condensation, according to exemplary embodiments of the present disclosure. The membrane structure 900 includes a carbon dioxide separation membrane 702 as described above. In addition, the membrane structure 900 includes two water blocking layers 902 and 904 on opposite sides of the membrane 702 that are configured to suppress water permeation across the carbon dioxide separation membrane 702. The water blocking layers 902 and 904 may be micro-porous, nano-porous, and/or hydrophobic. The water blocking layers 902 and 904 may be formed of, for example, porous Teflon (PTFE), polysulfone, or other suitable materials. According to some embodiments, one of the water blocking layers 902 and 904 may be omitted.

Without wishing to be bound by theory, it is thought that small pores on the order of 40 nm-1 micron create a tortuous path for water and $CO_2$ permeation in the hydrophobic layers 902 and/or 904. A thick layer can effectively suppress water permeation more than $CO_2$ permeation if the water permeation rate is much larger than the $CO_2$ permeation rate. Thick, or multilayered, micro- or nano-porous substrates can decrease the water permeation rate. In addition, smaller pore sizes can be used to further decrease the water permeation rate.

Figure 10:
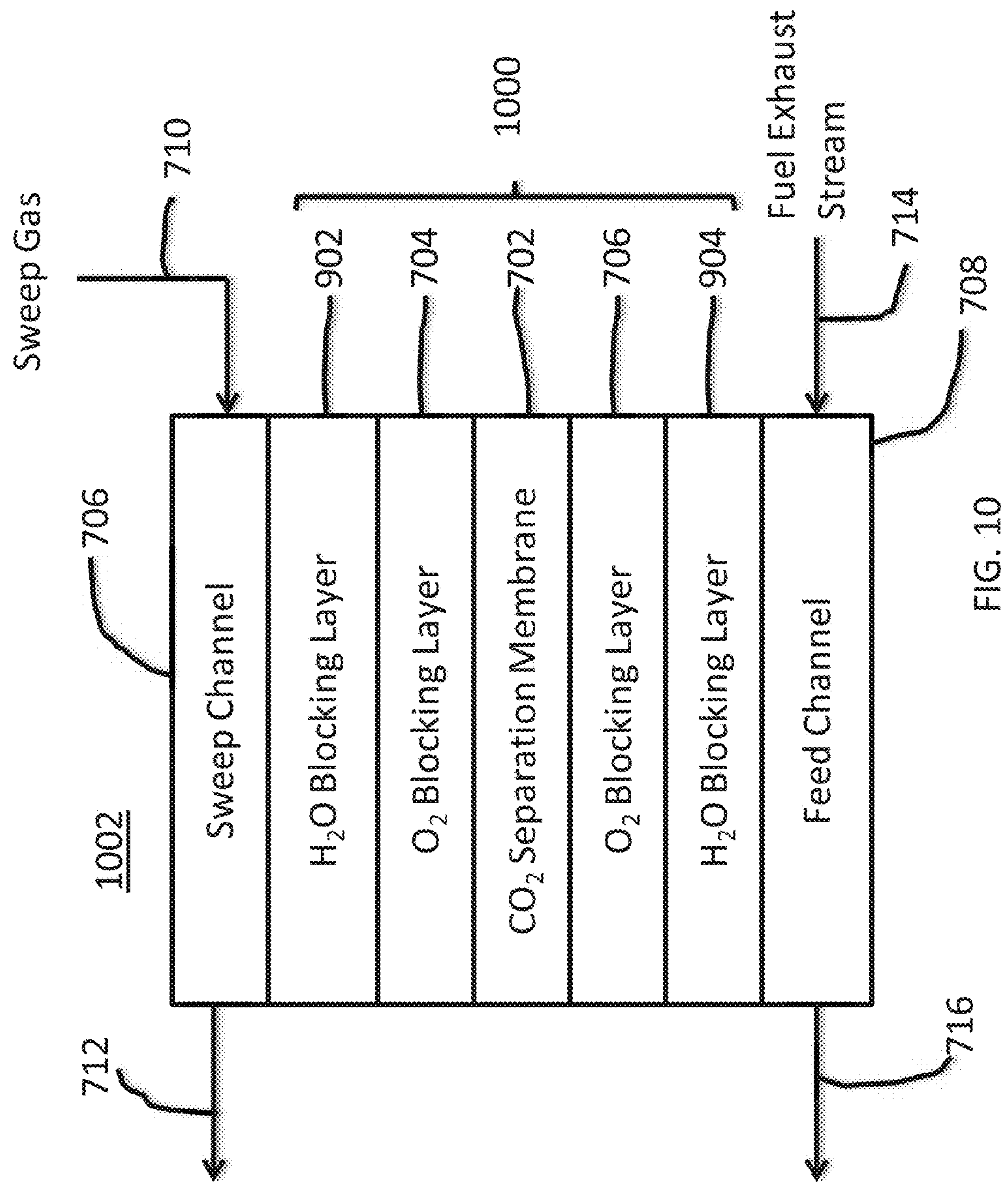

FIG. 10 illustrates a carbon dioxide separator 1002 that is similar to the carbon dioxide separator 902 of FIG. 9B. As such, similar elements are designated with similar reference numbers, and only the differences therebetween will be described in detail. Referring to FIG. 10, the carbon dioxide separator 1002 includes a membrane structure 1000, according to various embodiments of the present disclosure. The membrane structure 1000 includes a combination of elements described in FIGS. 7-9B. In particular, the membrane structure 1000 includes a carbon dioxide separation membrane 702, and one or both oxygen blocking layers 704 and/or 706 disposed on the sweep channel side and/or feed channel side of the membrane structure, respectively. The oxygen blocking layers 704 and/or 706 may be permeable to $CO_2$ and $H_2O$, impermeable, or substantially impermeable, to oxygen, and tolerant to oxygen.

In addition, the membrane structure 1000 includes one or both water blocking layers 902 and/or 904 configured to suppress water permeation across the membrane 702. According to some embodiments, one or more of the above layers may be omitted, and/or the order of the layers may be changed (e.g., water blocking layer(s) may be disposed closer to membrane 702 than the oxygen blocking layers 704 and 706 on the same side of the carbon dioxide separation membrane 702.

Figure 11:
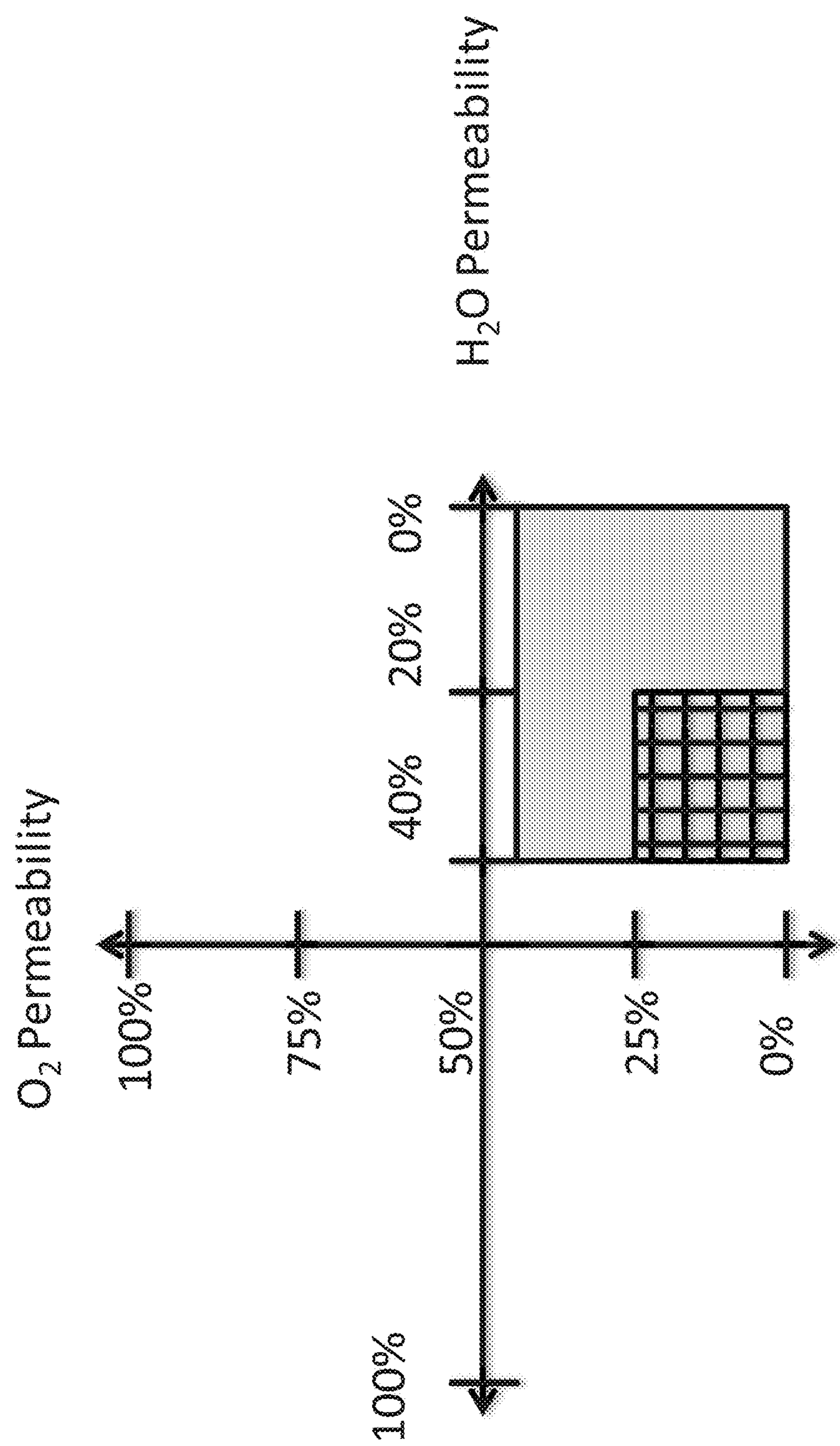
FIG. 11 is a schematic of a relationship between the oxygen and water permeability of a carbon dioxide separator.

FIG. 11 illustrates a comparison between the $O_2$ permeability and the $H_2O$ permeability of a carbon dioxide separator. Referring to FIG. 11, the shaded area is a region in which a carbon dioxide separator provides suitable $O_2$ permeability and $H_2O$ permeability for use in a fuel cell system. In particular, a carbon dioxide separator may have an $H_2O$ permeability ranging from about 0% to about 40%, and an $O_2$ permeability ranging from about 0% to about 45%. The cross-hatched portion of the shaded region represents a region in which a carbon dioxide separator provides improved $O_2$ permeability and $H_2O$ permeability for use in a fuel cell system. For example, a carbon dioxide separator may have an $H_2O$ permeability ranging from about 20% to about 40%, and an $O_2$ permeability ranging from about 0% to about 25%.

Accordingly, the present disclosure provides membranes having improved oxidation tolerance. As such, the present membranes may be operated with air sweep gas, a substantial simplification of the $CO_2$ permeable membrane subsystems. Further, the present disclosure provides high permeability/selectivity membranes that may be configured to operate at temperatures of about 120° C. In addition, the present disclosure provides for membranes that have improved robustness and lifetimes.

The fuel cell systems described herein may have other embodiments and configurations, as desired. Other components, such as fuel side exhaust stream condensers, heat exchangers, heat-driven pumps, turbines, additional gas separation devices, hydrogen separators which separate hydrogen from the fuel exhaust and provide hydrogen for external use, fuel processing subsystems, fuel reformers and or water gas shift reactors, may be added if desired. Furthermore, it should be understood that any system element or method steps described in any embodiment and/or illustrated in any figure may also be used in systems and/or methods of other suitable embodiments described above even if such use is not expressly described.

The foregoing description of the invention has been presented for purposes of illustration and description. It is not intended to be exhaustive or to limit the invention to the precise form disclosed, and modifications and variations are possible in light of the above teachings or maybe acquired a practice of the invention. The description was chosen in order to explain the principles of the invention and its practical application. It is intended that the scope of the invention as defined by the claims appended hereto, and their equivalents.

The invention claimed is:

1. A carbon dioxide separator for a fuel cell system, the carbon dioxide separator comprising:

a sweep channel configured to receive a sweep gas;

a feed channel configured to receive a fuel exhaust stream of the fuel cell system;

a carbon dioxide separation membrane disposed between the sweep channel and the feed channel, the carbon dioxide separation membrane having a higher permeability to carbon dioxide and water than to hydrogen gas, carbon monoxide, and nitrogen gas; and a first blocking layer disposed on a first side of the carbon dioxide separation membrane and comprising a first oxygen blocking layer disposed between the carbon dioxide separation membrane and the sweep channel, the oxygen blocking layer having a higher permeability to water and carbon dioxide than to oxygen gas and nitrogen gas.

2. The carbon dioxide separator of claim 1, wherein the first blocking layer further comprises a first water blocking layer that is hydrophobic and has a higher permeability to carbon dioxide than to water.

3. The carbon dioxide separator of claim 2, wherein:

the first oxygen blocking layer comprises polyethylene oxide (PEO); and the first water blocking layer comprises porous polytetrafluoroethylene (PTFE) or a porous polysulfone.

4. The carbon dioxide separator of claim 1, wherein the carbon dioxide separator has an oxygen gas permeability ranging from about 0% to about 25%, and a water permeability ranging from about 20% to about 40%.

5. The carbon dioxide separator of claim 1, wherein the carbon dioxide separation membrane comprises a (2-aminoisobutyric acid)-potassium salt (AIBA-K) or a glycine-potassium salt (glycine-K).

6. The carbon dioxide separator of claim 1, further comprising a second blocking layer disposed on an opposing second side of the carbon dioxide separation membrane and comprising at least one of:

a second oxygen blocking layer that has a higher permeability to water and carbon dioxide than to oxygen gas and nitrogen gas; and a second water blocking layer that is hydrophobic.

7. The carbon dioxide separator of claim 6, wherein the second blocking layer comprises the second water blocking layer.

8. The carbon dioxide separator of claim 7, wherein the first side of the carbon dioxide separation membrane faces the sweep channel and the second side of the carbon dioxide separation membrane faces the feed channel.

9. The carbon dioxide separator of claim 6, wherein the second blocking layer comprises the second oxygen blocking layer and the second water blocking layer.

10. The carbon dioxide separator of claim 9, wherein:

the first oxygen blocking layer is disposed between the carbon dioxide separation membrane and the first water blocking layer; and the second oxygen blocking layer is disposed between the carbon dioxide separation membrane and the second water blocking layer.

11. The carbon dioxide separator of claim 1, wherein the carbon dioxide separation membrane comprises active amine sites.

* * * * *